A. A. PINDSTOFTE.
MACHINE FOR AUTOMATICALLY FILLING BOTTLES.
APPLICATION FILED SEPT. 25, 1912.
1,052,377.
Patented Feb. 4, 1913.
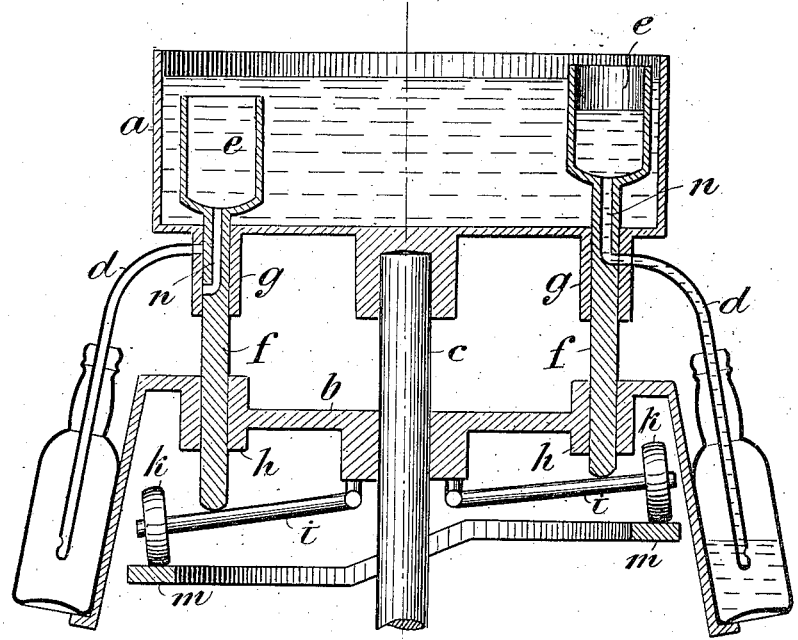
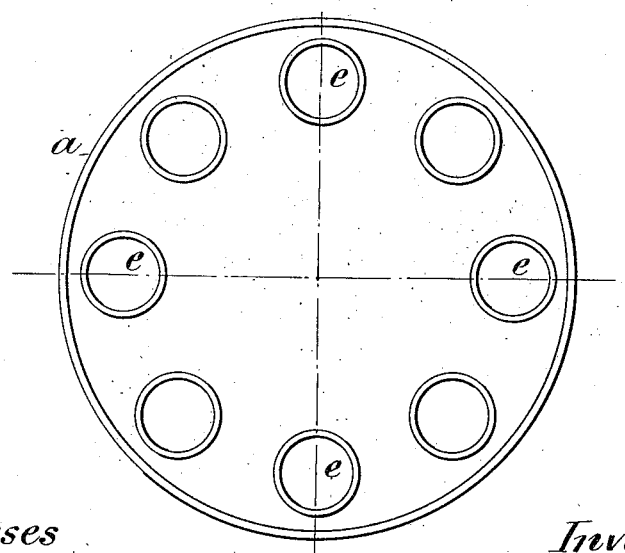
Witnesses
Inventor

UNITED STATES PATENT OFFICE.

ANDERS ANDERSEN PINDSTOFTE, OF FREDERIKSBERG, NEAR COPENHAGEN, DENMARK.

MACHINE FOR AUTOMATICALLY FILLING BOTTLES.

1,052,377. Specification of Letters Patent. Patented Feb. 4, 1913.

Application filed September 25, 1912. Serial No. 722,323.

*To all whom it may concern:*

Be it known that I, ANDERS ANDERSEN PINDSTOFTE, manufacturer, a subject of the Kingdom of Denmark, residing at Frederiksberg Alle 62, Frederiksberg, near Copenhagen, in Denmark, have invented certain new and useful Improvements in Machines for Automatically Filling Bottles; and I do hereby declare the following to be a full, clear, and exact description of the invention, such as will enable others skilled in the art to which it appertains to make and use the same.

The invention relates to a device for automatically filling bottles.

The improved device consists of a liquid reservoir, in which a constant liquid level is maintained by means well known forming no part of my invention and therefore not shown, and in which a number of measuring vessels are arranged, which by means of suitable means are moved vertically up and down, and which are automatically filled and emptied, respectively when they are below and over the liquid level.

In known devices of this kind the delivery pipes are moved up and down together with the measuring vessels, and said delivery pipes are closed by a valve, which automatically opens when the measuring vessel rises over the liquid level, and which again closes when the measuring vessel again immerges into the liquid. Movable delivery pipes have however important drawbacks, and the valves make the device complicated and cause very often working-disturbances and further they make the cleaning difficult. Further the delivery pipes moved up and down with the measuring vessels and the valves moved up and down will prevent the employment of the apparatus for continuous measuring out fresh milk and cream, as the reciprocating movement produces a churn action producing butter, which latter acidulates the milk or the cream, thereby debasing the quality of it, and further causes the pipes and the valves to be choked, so that the use of the apparatus is prevented or frequent cleaning is required, that of course retards the work and makes the use of the apparatus difficult. All these drawbacks are prevented by the invention in accordance to which the delivery pipes are stationary and valves are omitted, so that the apparatus can be employed for continuous measuring out fresh milk and cream, as butter can not be produced by the movements necessary for the measuring out.

The apparatus is substantially characterized by the fact that the delivery pipes are in fixed connection with the wall of the liquid reservoir, and thereby that the upper end of said delivery pipes can be put in connection with a channel issuing from the bottom of the measuring vessels, which channel is moved up and down with said measuring vessels and preferably provided in the vertical guide rod of the latter. The arrangement is such that the connection between said channels and their respective delivery pipes is automatically established when the measuring vessels rise over the liquid level, while said connection is broken, as soon as the measuring vessels again immerge into the liquid. When said connection is established the liquid contained in the measuring vessels is delivered through the delivery pipes, when the connection is closed the measuring vessels are refilled.

A constructional form of the invention is illustrated on the drawing, on which—

Figure 1 shows a vertical section through a device having a revoluble liquid reservoir. and Fig. 2 shows a plan of the liquid reservoir and the measuring vessel arranged in it.

The liquid reservoir $a$ and its bottle carrying frame $b$ are fixed to a shaft $c$, which is rotated by suitable means, not shown.

The rotation may be continuously or stepwise.

In the liquid reservoir are arranged measuring vessels $e$, the number of which corresponds to the number of the fixed delivery pipes $d$; the measuring vessels are supported by rods $f$, which can slide up and down in guides $g$ and $h$, respectively in the bottom of the liquid reservoir and in the bottle carrying frame. The lower end of each rod rests on a shaft $i$ pivotally connected to the frame $b$ (a shaft for each rod), which shaft carries a roller $k$, which during the revolution of the liquid reservoir runs along a stationary cam $m$ of such a shape, that the measuring vessels during a part of each full revolution, for instance about the half of it, are immerged into the liquid and filled, while said measuring vessels during another part of said full revolution, for instance also about the half of it, are raised above the liquid level (see the right hand side of Fig. 1).

From the bottom of each measuring vessel issues a channel *n* provided in the rod *f*, which channel, when the measuring vessel is raised over the liquid level, is put in connection to the corresponding fixed delivery pipe *d*, so that the liquid contained in the measuring vessel is automatically delivered.

When the measuring vessel immerges into the liquid for being refilled, the connection between the channel *n* and the delivery pipe is automatically broken (see the left hand side of Fig. 1).

The illustrated constructional details may of course be varied without departing from the principle of the invention. As mentioned the liquid reservoir may for instance be stationary in which case the cam is movable.

When only small quantities of liquid are to be measured out the channel *n* provided in the guide rod *f* can serve as measuring vessel, so that special measuring vessels are omitted.

Claims—

1. In a device for automatically filling bottles, the combination of a rotatory liquid reservoir, a number of vertically movable measuring vessels arranged in said reservoir, and a stationary cam which during the revolution of the liquid reservoir causes said measuring vessels to be alternately raised over and lowered below the liquid level, with channels issuing from the bottom of said measuring vessels and moved up and down with the latter, and delivery pipes corresponding in number to the number of measuring vessels and being in fixed connection with said liquid reservoir and each delivery pipe having its upper end in such a position that it is put in connection with the corresponding of said channels, when the measuring vessel combined with said channel is raised over the liquid level; substantially as described and for the purpose specified.

2. In a device for automatically filling bottles, the combination of a liquid reservoir, a number of vertically movable measuring vessels arranged in said reservoir, and a movable cam causing said measuring vessels to be alternately raised over and lowered below the liquid level, with channels issuing from the bottom of said measuring vessels and moved up and down with the latter, and delivery pipes corresponding in number to the number of measuring vessels and being in fixed connection with said liquid reservoir and each delivery pipe having its upper end in such a position, that it is put in connection with the corresponding of said channels when the measuring vessel combined with said channel is raised over the liquid level; substantially as described and for the purpose specified.

3. In a device for automatically filling bottles, the combination of a liquid reservoir, a number of vertically movable measuring vessels arranged in said reservoir and provided with vertically movable guide rods and means for causing said measuring vessels to be alternately raised over and lowered below the liquid level, with channels issuing from the bottom of said measuring vessels and bored in said guide rods, and delivery pipes corresponding in number to the number of measuring vessels and being in fixed connection with said liquid reservoir and each delivery pipe having its upper end in such a position, that it is put in connection with the corresponding of said channels, when the measuring vessel combined with said channel is raised over the liquid level; substantially as described and for the purpose specified.

In testimony whereof, I affix my signature in presence of two witnesses.

ANDERS ANDERSEN PINDSTOFTE.

Witnesses:
  C. E. CARTER,
  MARCUS ULOLLE.